United States Patent
Takeuchi (10) Patent No.: US 11,858,585 B2
(45) Date of Patent: Jan. 2, 2024

(54) STRADDLE VEHICLE

(71) Applicant: KAWASAKI MOTORS, LTD., Akashi (JP)

(72) Inventor: Hiroshi Takeuchi, Kobe (JP)

(73) Assignee: KAWASAKI MOTORS, LTD., Akashi (JP)

(*) Notice: Subject to any disclaimer, the term of this patent is extended or adjusted under 35 U.S.C. 154(b) by 264 days.

(21) Appl. No.: 17/370,264

(22) Filed: Jul. 8, 2021

(65) Prior Publication Data

US 2022/0009586 A1 Jan. 13, 2022

(30) Foreign Application Priority Data

Jul. 10, 2020 (JP) .................. 2020-119146

(51) Int. Cl.
*B62K 25/28* (2006.01)
*B62K 11/04* (2006.01)
(Continued)

(52) U.S. Cl.
CPC ............... *B62K 25/10* (2013.01); *B62J 43/16* (2020.02); *B62K 11/04* (2013.01); *B62K 25/283* (2013.01); *B62K 25/286* (2013.01); *B62M 7/04* (2013.01); *B62M 7/08* (2013.01); *B62M 23/02* (2013.01); *B62K 2201/04* (2013.01); *B62K 2204/00* (2013.01)

(58) Field of Classification Search
CPC .............................. B62K 11/04; B62K 25/286
See application file for complete search history.

(56) References Cited

U.S. PATENT DOCUMENTS 4,753,314 A * 6/1988 Tsukiji ................ B62K 25/286
180/227
9,828,058 B2 * 11/2017 Ishii ..................... B62K 25/286
(Continued)

FOREIGN PATENT DOCUMENTS

EP 2799325 A1 * 11/2014 ................ B60L 1/02
EP 2799325 A1 11/2014
(Continued)

OTHER PUBLICATIONS

European Patent Office, Extended European Search Report Issued in Application No. 21183928.7, dated Oct. 21, 2021, Germany, 12 pages.

*Primary Examiner* — Minnah L Seoh
*Assistant Examiner* — Hosam Shabara
(74) *Attorney, Agent, or Firm* — Alleman Hall Creasman & Tuttle LLP (57) ABSTRACT

Provided is a straddle vehicle that allows for high design flexibility, that can absorb strong shocks applied in the up-down direction, and that can avoid contacting obstacles on the ground. The straddle vehicle includes a supported structure and a shock absorber. The supported structure includes a first element that performs a first function and a second element that performs a second function, the second element being located above a rear of the first element. The shock absorber includes an upper mounting portion and a lower mounting portion. The lower mounting portion of the shock absorber is connected to a swing arm, and the upper mounting portion of the shock absorber is connected to the second element.

16 Claims, 9 Drawing Sheets

(51) Int. Cl.
  *B62K 25/10*  (2006.01)
  *B62M 7/08*  (2006.01)
  *B62M 7/04*  (2006.01)
  *B62M 23/02*  (2010.01)
  *B62J 43/16*  (2020.01)

(56) References Cited

U.S. PATENT DOCUMENTS

| | | | |
|---|---|---|---|
| 10,710,666 B2 * | 7/2020 | Makihara | B62K 11/04 |
| 11,142,285 B2 * | 10/2021 | Futamata | B62J 43/16 |
| 11,198,484 B2 * | 12/2021 | Aunkst | B62J 43/16 |
| 11,623,709 B2 * | 4/2023 | Aunkst | B62J 43/16 |
| | | | 180/220 |
| 2014/0183837 A1 | 7/2014 | Ishii et al. | |
| 2018/0229797 A1 | 8/2018 | Makihara et al. | |
| 2020/0031425 A1 | 1/2020 | Aunkst et al. | |
| 2020/0172196 A1 | 6/2020 | Futamata et al. | |

FOREIGN PATENT DOCUMENTS

| | | | |
|---|---|---|---|
| EP | 3604013 A1 | 2/2020 | |
| JP | H01156118 A | 6/1989 | |
| JP | 2546130 A1 | 1/2013 | |
| JP | 2014125182 A | 7/2014 | |
| JP | 2018131001 A | 8/2018 | |
| JP | 2018158616 A * | 10/2018 | B60K 6/387 |
| WO | 2019/049462 A1 | 3/2019 | |

* cited by examiner

STRADDLE VEHICLE

CROSS-REFERENCE TO RELATED APPLICATION

This application claims priority to and the benefit of Japanese Patent Application No. 2020-119146, filed on Jul. 10, 2020, the entire disclosure of which is incorporated herein by reference.

BACKGROUND

Technical Field

The present disclosure relates to a straddle vehicle including a shock absorber to absorb shocks applied to the vehicle.

Description of the Related Art

In general, a straddle vehicle includes a shock absorber to absorb shocks applied from the rear wheel of the vehicle during travel (see Japanese Laid-Open Patent Application Publication No. 2018-131001, for example). In the straddle vehicle disclosed in Japanese Laid-Open Patent Application Publication No. 2018-131001, the shock absorber is mounted at its upper mounting portion on a vehicle body frame via a pivot bracket pivotally supporting a swing arm and mounted at its lower mounting portion on the swing arm directly or via a link.

In the case where the straddle vehicle disclosed in Japanese Laid-Open Patent Application Publication No. 2018-131001 travels on rough terrain, the height of the location of the upper mounting portion of the shock absorber could be insufficient.

During travel of a straddle vehicle on rough terrain, a great force is sometimes exerted on the rear wheel of the vehicle. In such situations, the shock absorber is required to absorb the great force. Thus, a straddle vehicle which may travel on rough terrain is required to be equipped with a long shock absorber. Additionally, the minimum height from the ground to the lower end of the shock absorber is required to be large enough to prevent the shock absorber from contacting obstacles on the ground.

SUMMARY

A straddle vehicle according to an aspect of the present disclosure includes: a front wheel; a rear wheel; a vehicle body frame; a suspension structure including a swing arm rotatably supporting the rear wheel and a shock absorber to absorb shocks applied to the swing arm through the rear wheel, the swing arm being elastically suspended on the vehicle body frame via the shock absorber; and a supported structure supported by the vehicle body frame, wherein the supported structure includes a first element that performs a first function and a second element that performs a second function, the second element being located above a rear of the first element, wherein at least one of the first element or the second element is a drive source that produces rotational drive power to be transmitted to the rear wheel, wherein the shock absorber includes an upper mounting portion and a lower mounting portion, wherein the lower mounting portion of the shock absorber is connected to the swing arm, and wherein the upper mounting portion of the shock absorber is connected to the second element.

In the above configuration, the second element is located above the rear of the first element, and the upper mounting portion of the shock absorber is connected to the second element. Thus, the upper mounting portion of the shock absorber is at a high location. As such, in the shock absorber mounted on the straddle vehicle, a sufficient height difference can be provided between the upper and lower mounting portions. This allows the shock absorber to be long enough to absorb strong shocks applied during travel. Additionally, the height from the ground to the lower end of the shock absorber can be sufficiently large. This permits the shock absorber to avoid contacting obstacles on the ground during travel.

BRIEF DESCRIPTION OF THE DRAWINGS

FIGS. 7A and 7B are each a left side view of a power unit, a rear shock absorber, a rear suspension, and their vicinity in a motorcycle of a variant.

DETAILED DESCRIPTION OF THE EMBODIMENTS

Hereinafter, motorcycles according to exemplary embodiments will be described with reference to the accompanying drawings. The directions mentioned in the following description are those based on the viewpoint of the rider seated on the motorcycle.

First Embodiment

Figure 1:
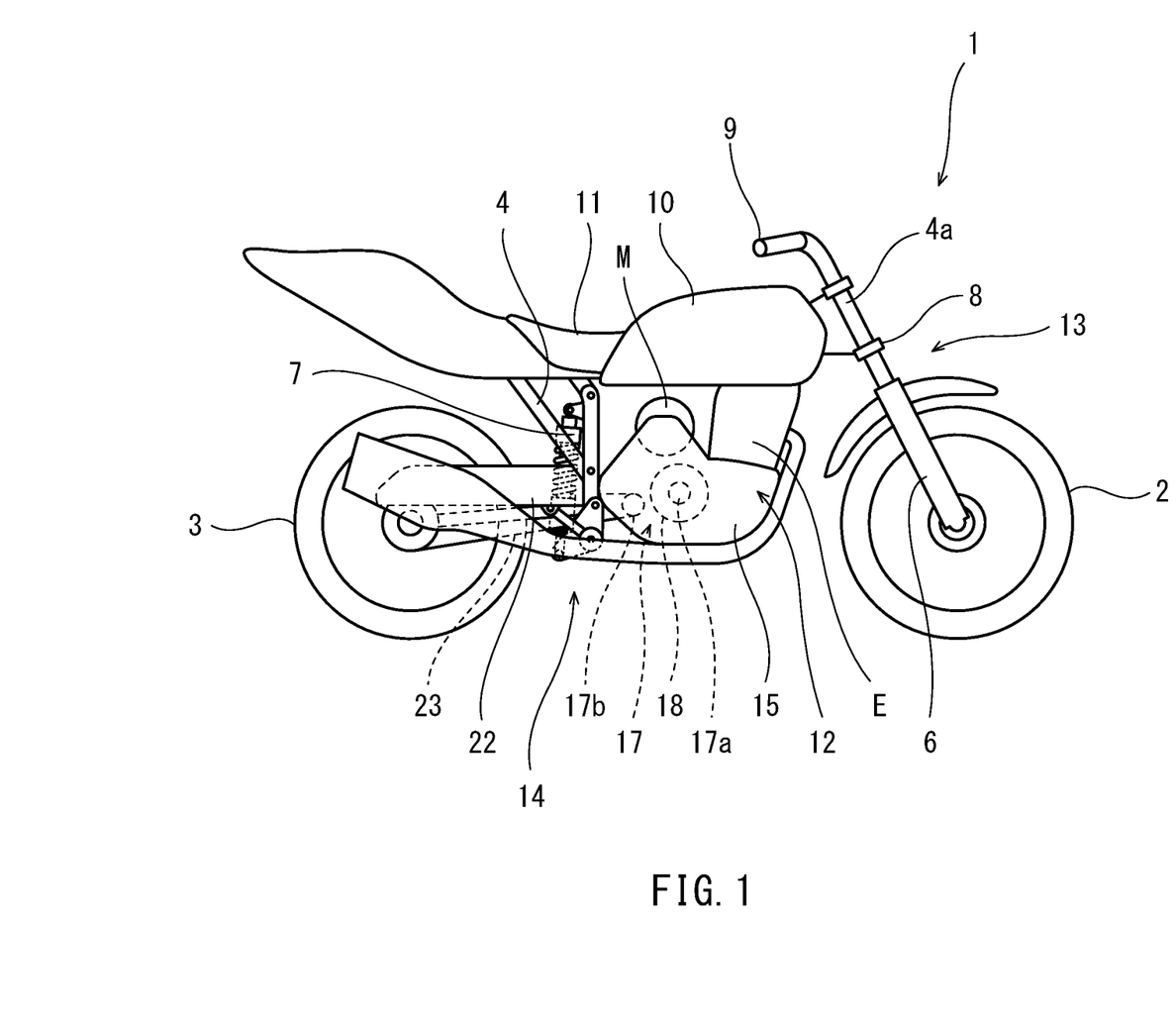
FIG. 1 is a side view of a motorcycle according to a first embodiment.

FIG. 1 is a side view of a motorcycle 1 according to a first embodiment. As shown in FIG. 1, the motorcycle 1 is an example of a straddle vehicle on which the rider is seated in a straddling position. The motorcycle 1 is a hybrid vehicle. The motorcycle 1 includes a front wheel 2, a rear wheel 3 (drive wheel), a vehicle body frame 4, a front shock absorber 6, and a rear shock absorber 7 (shock absorber). In the present embodiment, the devices contractible to absorb forces exerted on the vehicle body and reduce the up-down motion of the vehicle body are referred to as the front and rear shock absorbers 6 and 7.

The front shock absorber 6 is located between the front wheel 2 and the front of the vehicle body frame 4. The rear shock absorber 7 is located between the rear wheel 3 and the rear of the vehicle body frame 4.

The front shock absorber 6 is located below the steering shaft and coupled to a bracket 8 spaced from the front shock absorber 6 in the up-down direction. The steering shaft connected to the bracket 8 is supported by a head pipe 4a in such a manner as to be angularly movable. The head pipe 4a is a part of the vehicle body frame 4.

A handle 9 grasped by the hands of the rider is mounted on the steering shaft. A fuel tank 10 is located behind the handle 9, and a seat 11 on which the rider sits is located behind the fuel tank 10. A power unit 12 serving as a drive source for travel is mounted on the vehicle body frame 4 and located between the front and rear wheels 2 and 3.

In the present embodiment, a structure including the front shock absorber 6 and suspended by a front portion of the vehicle body frame 4 in the vicinity of the front shock absorber 6 is referred to as a front suspension 13. In the present embodiment, the front suspension 13 is a front fork having a bifurcated shape and holding the front wheel 2 from both sides in the vehicle width direction. A structure including the rear shock absorber 7 and suspended by a rear portion of the vehicle body frame 4 in the vicinity of the rear shock absorber 7 is referred to as a rear suspension 14 (suspension structure).

The power unit 12 includes an engine E (first element) which is an internal combustion engine serving as a prime mover and a drive motor M (second element) which is an electric motor having a drive shaft and serving as a prime mover. In the present embodiment, the function of the engine E (first function) and the function of the drive motor M (second function) are the functions of drive sources that produce rotational drive power to be transmitted to the rear wheel 3. In the present embodiment, a structure located substantially at the center of the motorcycle 1 in the front-rear direction and supported by the vehicle body frame 4 is referred to as a supported structure. A lower element of the supported structure is referred to as a first element, and an element of the supported structure that is located above the first element is referred to as a second element. In the present embodiment, the power unit 12 is the supported structure of the motorcycle 1.

Figure 2:
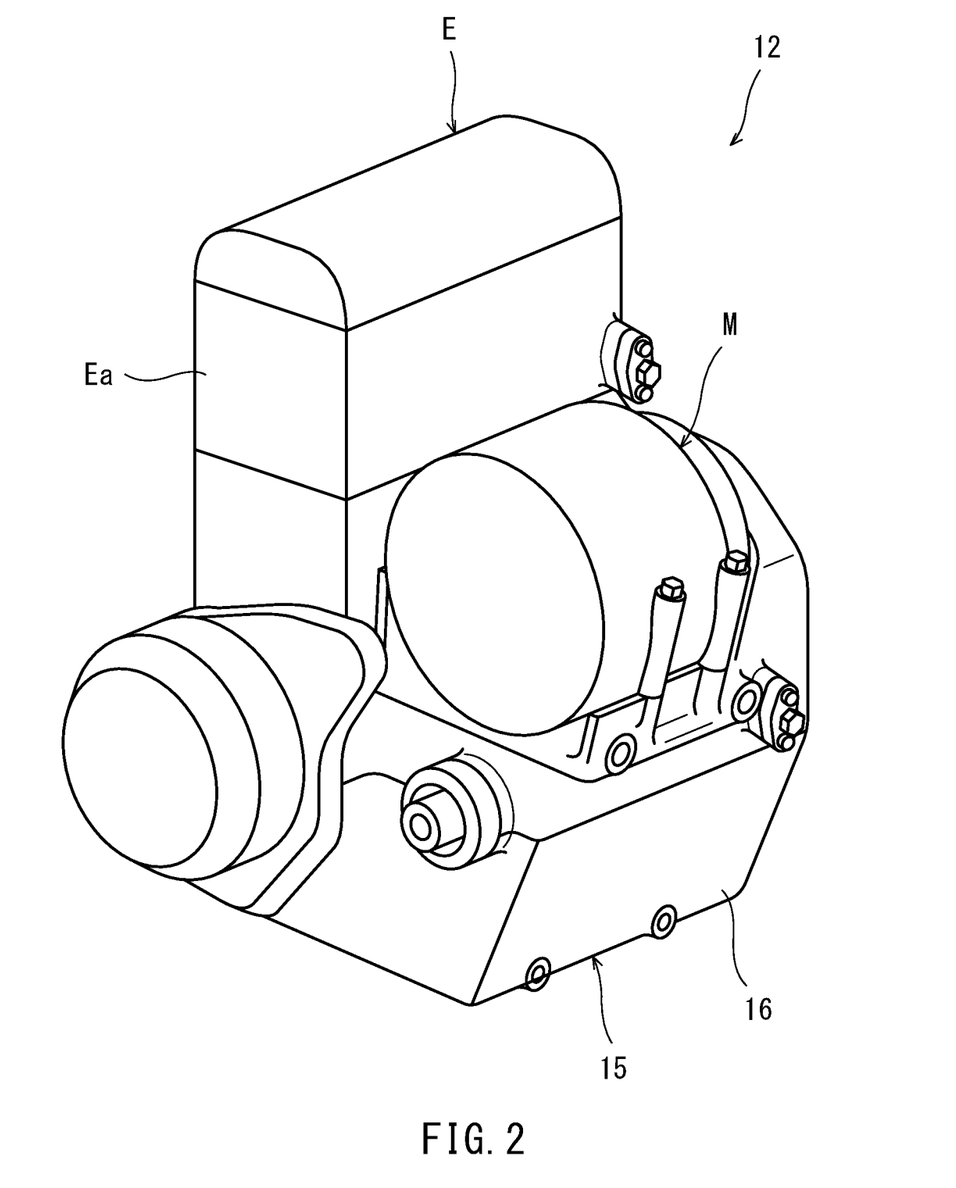
FIG. 2 is a left rear perspective view of a power unit of the motorcycle of FIG. 1.

FIG. 2 is a left rear perspective view of the power unit 12. The engine E includes a cylinder Ea extending upward from a front portion of the crankcase 15. The crankcase 15 includes a main body 16 protruding rearward from a lower portion of the cylinder Ea. The drive motor M is located behind the cylinder Ea and mounted on the upper surface of the main body 16. That is, the drive motor M is located above and aligned with the main body 16 in the up-down direction.

Figure 3:
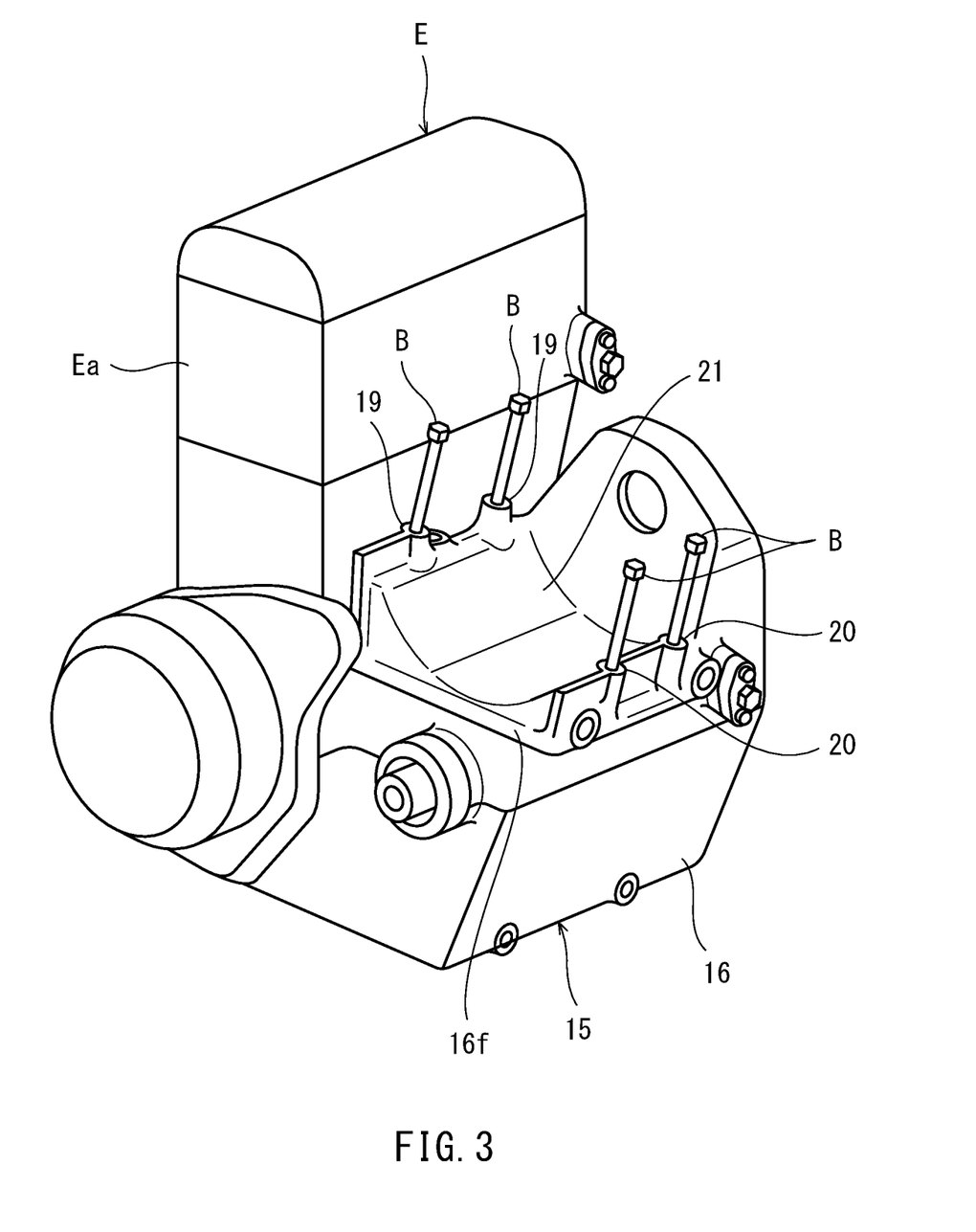
FIG. 3 is a perspective view of the power unit of FIG. 2 with a drive motor removed.
Figure 4:
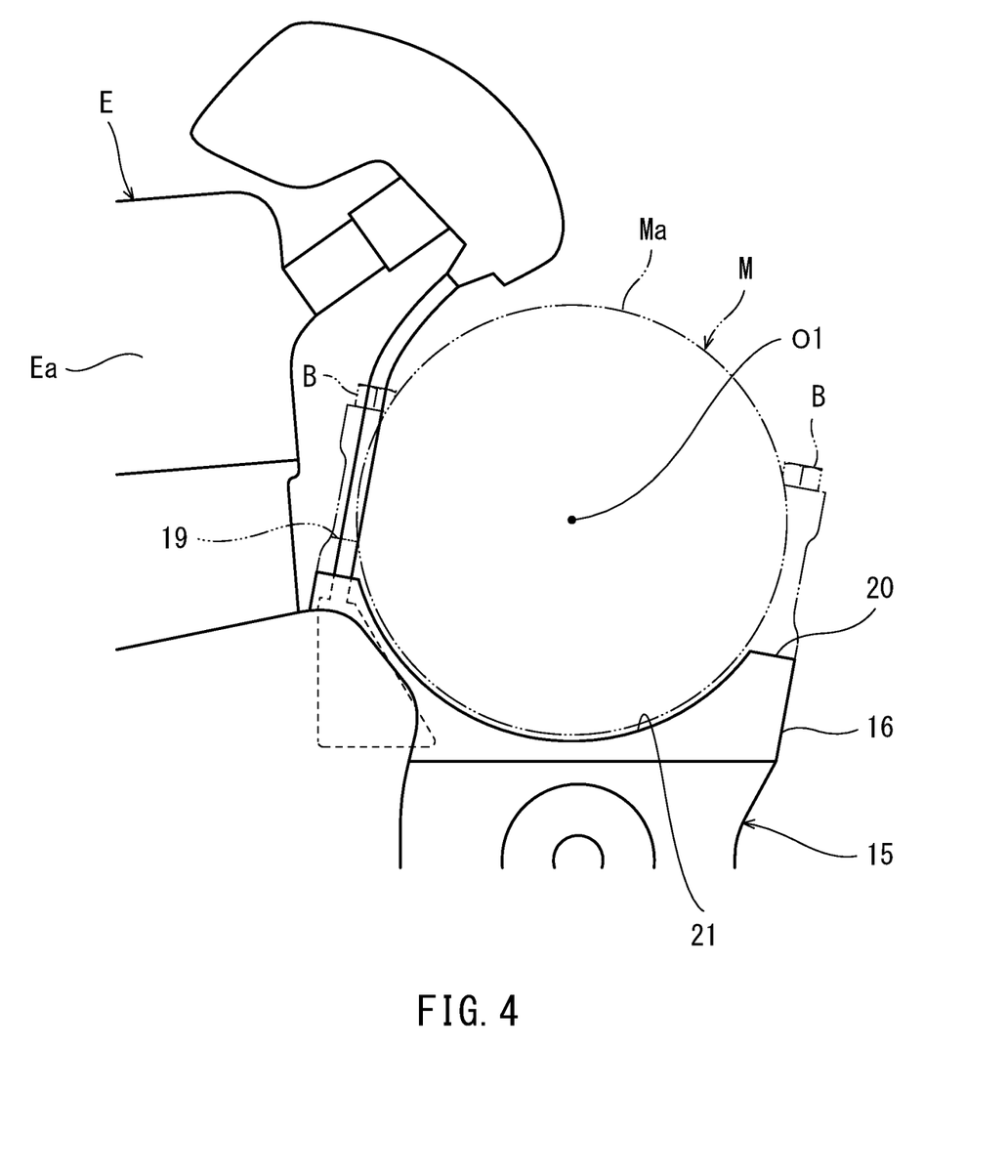
FIG. 4 is an enlarged left side view of a drive motor and its vicinity in the power unit of FIG. 2.

FIG. 3 is a perspective view of the power unit 12 of FIG. 2 with the drive motor M removed. FIG. 4 is an enlarged left side view of the drive motor M and its vicinity in the power unit 12 of FIG. 2. As shown in FIGS. 3 and 4, the main body 16 of the crankcase 15 includes an upper wall 16f, and the upper wall 16f includes a front mount portion 19, a rear mount portion 20, and an upper case surface 21. The front and rear mount portions 19 and 20 are, for example, receiving bases provided with bolt holes and protrude upward from the upper wall 16f of the main body 16. The front of the motor housing Ma is secured to the front mount portion 19 by fasteners B inserted from above. The rear of the motor housing Ma is secured to the rear mount portion 20 by fasteners B inserted from above. That is, the drive motor M is supported by the front and rear mount portions 19 and 20 of the crankcase 15.

The upper case surface 21 is defined between the front and rear mount portions 19 and 20 and arc-shaped to conform to the outer circumferential surface of the motor housing Ma. The motor housing Ma is close to but spaced from the upper case surface 21. The drive motor M is placed in such a manner that the lower portion of the motor housing Ma is held between the front and rear mount portions 19 and 20. This allows the crankcase 15 to stably support the drive motor M.

The motor housing Ma is made of metal. For example, the motor housing Ma is made of an aluminum alloy. One end of the motor housing Ma in the vehicle width direction is covered by a removable cover, and the rest of the motor housing Ma is formed as a one-piece component. That is, the outer circumferential surface of the motor housing Ma, which defines the radially outer boundary of the motor housing Ma, is continuous and seamless over its entirety. Thus, the motor housing Ma exhibits higher strength in the circumferential direction than in the vehicle width direction. The motor housing Ma, which is continuous over its entire circumference, has higher rigidity in the circumferential direction than in the vehicle width direction.

Referring back to FIG. 1, a transmission 17 is located behind the engine E. The transmission 17 includes an input shaft 17a, an output shaft 17b, and a plurality of gear pairs having different reduction ratios. The transmission 17 transmits power from the input shaft 17a to the output shaft 17b through one of the gear pairs. The transmission 17 selects a desired one of the gear pairs and performs speed change by the selected gear pair. The transmission 17 is, for example, a dog clutch transmission.

ECU (electronic control unit) controls the engine E. Specifically, the ECU controls a throttle device, fuel injector, and igniter to control the engine E.

A main clutch 18 is located between the engine E and the transmission 17. The main clutch 18 is engaged and disengaged to connect and disconnect the output shaft 35 (FIG. 6) of the engine E and the input shaft 17a of the transmission 17. The engagement and disengagement of the main clutch 18 can be controlled by the ECU.

The output shaft of the drive motor M is connected to the input shaft 17a of the transmission 17 via a gear. Thus, drive power produced by the drive motor M can be transmitted to the input shaft 17a. The ECU can control the operation of the drive motor M. Thus, the ECU can control the drive power of the engine E and the drive power of the drive motor M separately.

A swing arm 22 supporting the rear wheel 3 and extending in the front-rear direction is supported by the vehicle body frame 4 in such a manner as to be angularly movable. The rotational power of the output shaft 17b of the transmission 17 is transmitted to the rear wheel 3 through an output transmission structure 23 (such as a chain or belt).

Figure 5:
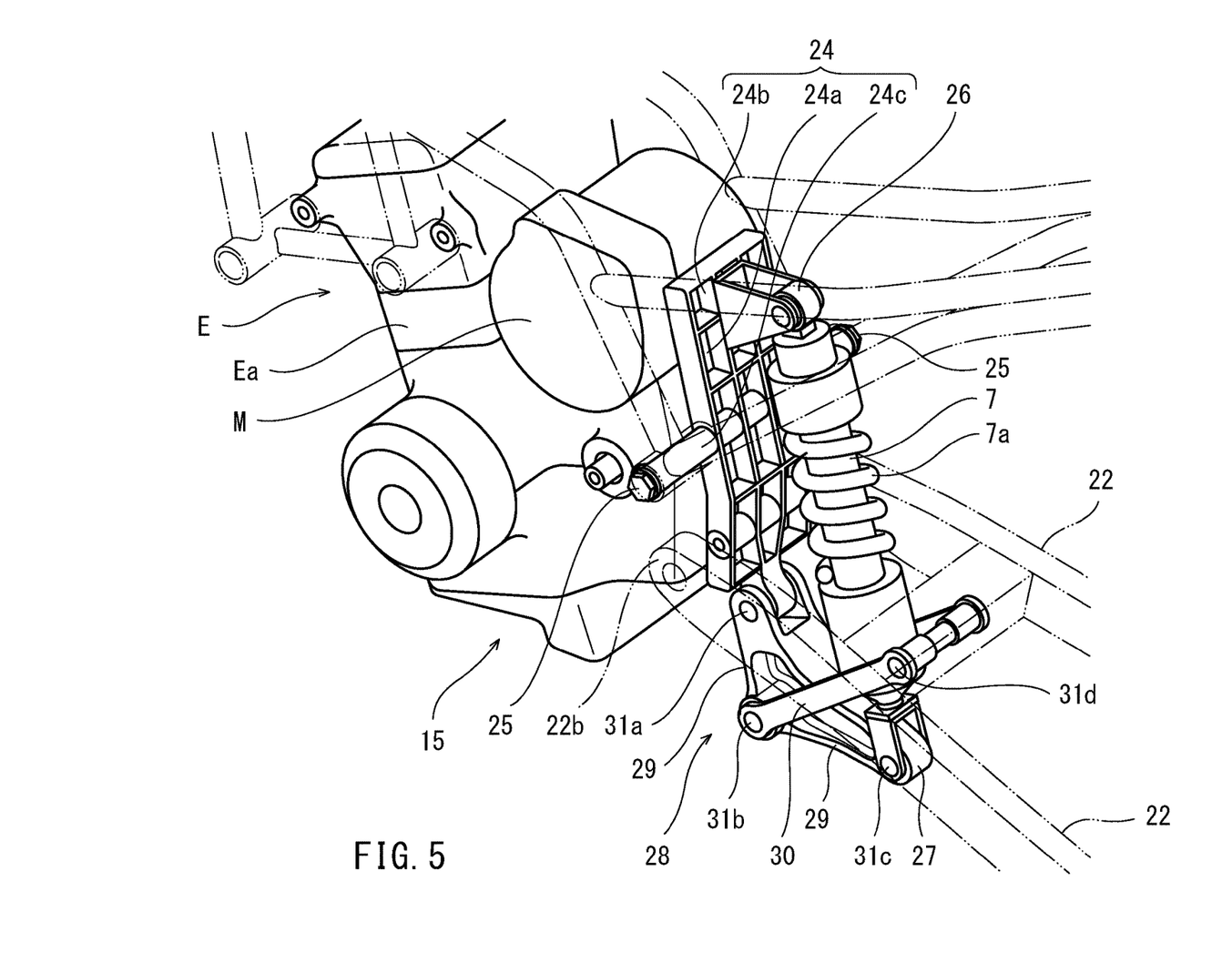
FIG. 5 is a perspective view of the power unit, the rear shock absorber, and their vicinity in the motorcycle of FIG. 1.
Figure 6:
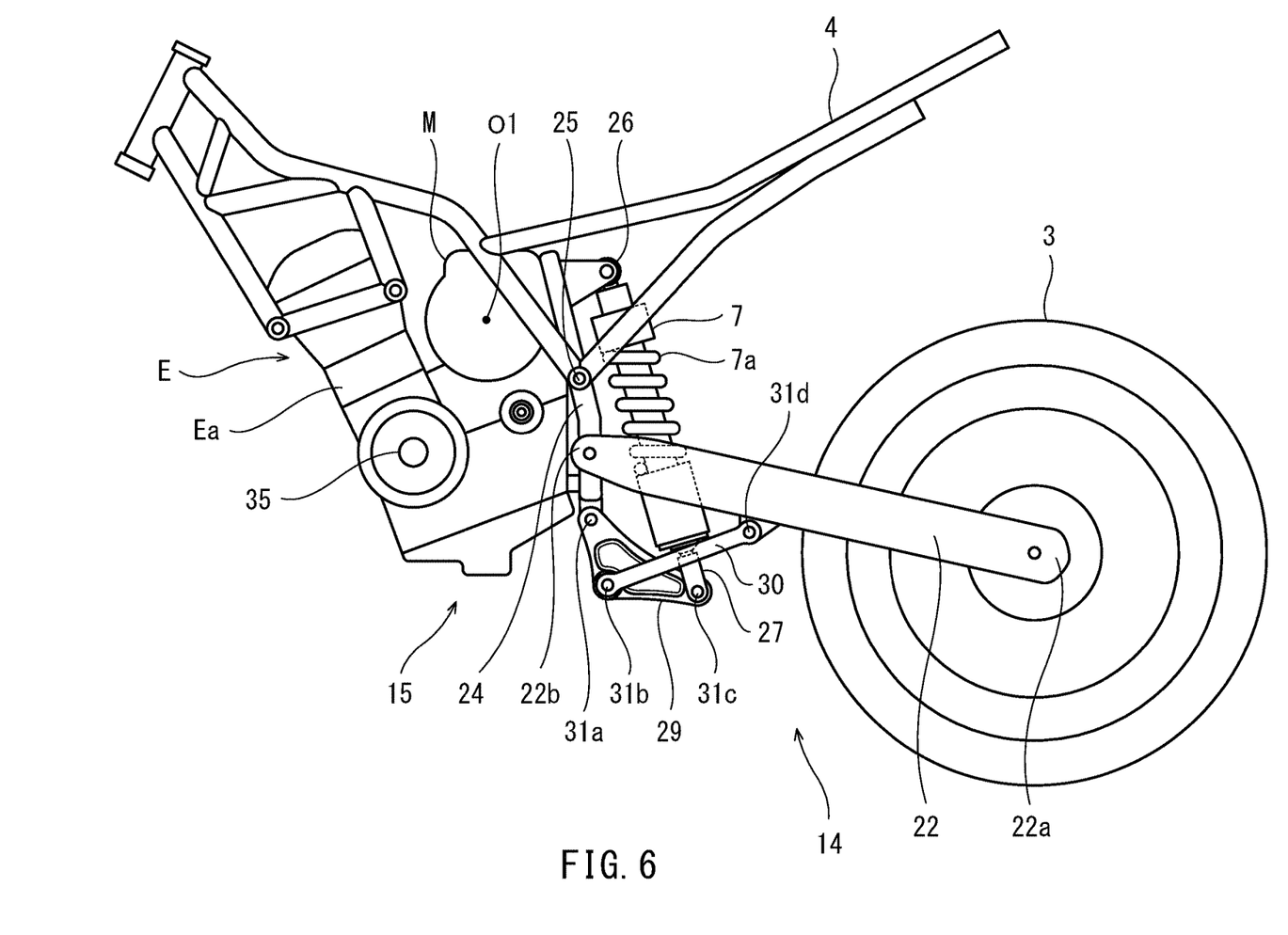
FIG. 6 is a left side view of the power unit, the rear shock absorber, the rear suspension, and their vicinity in the motorcycle of FIG. 1.

FIG. 5 is a perspective view of the rear shock absorber 7 and its vicinity. In FIG. 5, the vehicle body frame 4 and swing arm 22 are shown by double-dotted dashed lines. FIG. 6 is a side view of the rear shock absorber 7 and its vicinity. The rear shock absorber 7 includes an elastic component. In the present embodiment, the rear shock absorber 7 includes a coil spring 7a as the elastic component. In the present embodiment, the coil spring 7a is located on the radially outer side of the rear shock absorber 7. The rear shock absorber 7 exhibits a damping force against an applied force and absorbs a shock applied to the swing arm 22 through the rear wheel 3. The rear suspension 14 suspends the swing arm 22 on the vehicle body frame 4 via the rear shock absorber 7.

The motorcycle 1 includes a bridge structure 24 located behind the engine E and drive motor M and mounted on both the engine E and drive motor M to bridge the engine E and drive motor M. In the present embodiment, the bridge structure 24 is plate-shaped. The bridge structure 24 has the function of a bridge structure mounted on the engine E and drive motor M to bridge the engine E and drive motor M. Since the bridge structure 24 is mounted on the engine E and drive motor M to bridge the engine E and drive motor M, the engine E and drive motor M are connected so securely that the engine E and drive motor M are prevented from moving away from each other.

In the present embodiment, the bridge structure 24 is formed as a one-piece component using a hard plastic. The bridge structure 24 includes a plate portion 24a located on the front of the bridge structure 24, a rib 24b protruding rearward from the plate portion 24a, and a connection portion 24c connected to the vehicle body frame 4. The rib 24b has a portion extending in the vehicle width direction and a portion extending in the height direction, and these portions cross each other. Since the rib 24b is located behind the plate portion 24a, the strength of the bridge structure 24 in the compression direction can be increased, and the weight of the bridge structure 24 can be reduced.

The connection portion 24c protrudes outward in the vehicle width direction and is connected to the vehicle body frame 4 at a point outward of the plate portion 24a in the vehicle width direction. For example, the connection portion 24c is provided with a hole extending inward from the outer end of the connection portion 24c in the vehicle width direction. The inner circumferential surface of the connection portion 24c which defines the hole is provided with internal threads. The portion of the vehicle body frame 4 that is connected to the connection portion 24c is provided with a hole extending through the entire width of the vehicle body frame 4 in the vehicle width direction. A bolt 25 is inserted into both the hole of the connection portion 24c and the hole of the vehicle body frame 4. The external threads of the bolt 25 and the internal threads of the connection portion 24c are engaged, so that the connection portion 24c and the vehicle body frame 4 are connected. Consequently, the bridge structure 24 and the vehicle body frame 4 are connected.

In the present embodiment, the bridge structure 24 extends upward to a height above the connection portion 24c connected to the vehicle body frame 4. In the present embodiment, the rear shock absorber 7 includes an upper mounting portion 26 connected to the vicinity of the upper end of the bridge structure 24. Thus, the upper mounting portion 26 of the rear shock absorber 7 is located at a height above the connection portion 24c at which the bridge structure 24 is connected to the vehicle body frame 4. The connection portion 24c at which the bridge structure 24 is connected to the vehicle body frame 4 is disposed on each side of the bridge structure 24 in the vehicle width direction, and the two opposing connection portions 24c are located at the same height in the up-down direction. Thus, the upper mounting portion 26 is located at a height above all of the connection portions 24c. In the present embodiment, the upper mounting portion 26 of the rear shock absorber 7 is located at a height above that upper case surface 21 of the crankcase 15 on which the drive motor M is supported. In particular, in the present embodiment, the upper mounting portion 26 of the rear shock absorber 7 is located at a height above the drive shaft O1 of the drive motor M as shown in FIG. 6. Additionally, the upper mounting portion 26 of the rear shock absorber 7 is located at a height such that the upper mounting portion 26 as viewed in the front-rear direction overlaps the cylinder Ea of the engine E.

The rear shock absorber 7 includes, in addition to the upper mounting portion 26, a lower mounting portion 27 that is also connected to the bridge structure 24. The upper mounting portion 26 connects the rear shock absorber 7 to the bridge structure 24 at an upper point. The lower mounting portion 27 connects the rear shock absorber 7 to the bridge structure 24 at a lower point. In the present embodiment, the upper mounting portion 26 is located at the upper end of the rear shock absorber 7, and the lower mounting portion 27 is located at the lower end of the rear shock absorber 7.

The upper mounting portion 26 of the rear shock absorber 7 is connected to the drive motor M via the bridge structure 24. The lower mounting portion 27 of the rear shock absorber 7 is connected to the swing arm 22 via a link 28.

The following will describe the link 28. In the present embodiment, the link 28 includes a triangular link plate 29 and a rectangular link plate 30 longer in one direction than in the other direction. The triangular link plate 29 is located between the bridge structure 24 and the lower mounting portion 27 of the rear shock absorber 7. The triangular link plate 29 is plate-shaped and includes three nodes 31a, 31b, and 31c located respectively at the three vertices of the triangle.

In the present embodiment, the rectangular link plate 30 is located between the triangular link plate 29 and the swing arm 22. The rectangular link plate includes a node 31d at an end opposite to that at which the node 31b is located.

The triangular link plate 29 is pivotally connected to the bridge structure 24 by one of the three nodes 31a, 31b, and 31c, in particular by the node 31a. The triangular link plate 29 is pivotally connected to the lower mounting portion 27 of the rear shock absorber 7 by another of the three nodes 31a, 31b, and 31c, in particular by the node 31c. The triangular link plate 29 is pivotally connected to the rectangular link plate 30 by the other of the three nodes 31a, 31b, and 31c, in particular by the node 31b. The rectangular link plate 30 is pivotally connected to the swing arm 22 by one of the two opposite nodes 31b and 31d, in particular by the node 31d.

In the present embodiment, the swing arm 22 has an end 22a supporting the rear wheel 3 and an end 22b opposite to the end 22a, and the end 22b is connected to the bridge structure 24. The swing arm 22 is pivotally connected to the bridge structure 24. Thus, the swing arm 22 supporting the rear wheel 3 and extending in the front-rear direction is supported by the vehicle body frame 4 in such a manner as to be angularly movable.

In the motorcycle 1 configured as described above, in the event that a force is applied to the rear wheel 3 in the up-down direction, the up-down motion of the rear wheel 3 is transmitted to the rectangular link plate 30 through the swing arm 22. Since the rectangular link plate 30 and the triangular link plate 29 are pivotally connected via the node 31b, a motion of the rectangular link plate 30 induces a motion of the triangular link plate 29.

Since the triangular link plate 29 is connected to the lower mounting portion 27 of rear shock absorber 7 via the node 31c, a motion of the triangular link plate 29 induces a motion of the lower mounting portion 27. The motion transmitted to the lower mounting portion 27 of the rear shock absorber 7 can be absorbed by the rear shock absorber 7 exhibiting a damping force. In this manner, the force applied to the rear wheel 3 is absorbed by the rear shock absorber 7.

Since the bridge structure 24 is mounted on the engine E and drive motor M to bridge the engine E and drive motor M and since the upper mounting portion 26 is connected to the drive motor M via the bridge structure 24, a load applied to the rear shock absorber 7 in the up-down direction is transmitted to the drive motor M through the bridge structure 24 and acts on the drive motor M in the circumferential direction. The drive motor M has higher rigidity in the circumferential direction than in the vehicle width direction. Thus, in the event that a load is applied to the rear shock absorber 7 in the up-down direction, the drive motor M receives the load in a direction in which the drive motor M has high rigidity. As such, the drive motor M exhibits high rigidity against loads applied to the drive motor M through the rear shock absorber 7.

In the present embodiment, the link 28 supports the rear shock absorber 7 at a location below the engine E in the absence of any load acting on the rear shock absorber 7.

In the present embodiment, the drive motor M is located above the rear of the engine E, and the upper mounting portion 26 of the rear shock absorber 7 is connected to the drive motor M via the bridge structure 24. Thus, the upper mounting portion 26 of the rear shock absorber 7 is at a high location. As such, in the rear shock absorber 7 mounted on the motorcycle 1, a sufficient height difference can be provided between the upper and lower mounting portions 26 and 27. This allows the rear shock absorber 7 to be long enough to absorb strong shocks applied during travel. Additionally, the height from the ground to the lower end of the rear shock absorber 7 can be sufficiently large. This permits the rear shock absorber 7 to avoid contacting obstacles on the ground during travel.

In particular, in the present embodiment, the bridge structure 24 extends upward to a height above the connection portion 24c at which the bridge structure 24 is connected to the vehicle body frame 4, and the upper mounting portion 26 of the rear shock absorber 7 is located at a height above the connection portion 24c. Thus, the height of the location of the upper mounting portion 26 can be further increased. This allows for a further increase in the height difference between the upper and lower mounting portions 26 and 27 and hence a further increase in the length of the rear shock absorber 7, permitting the rear shock absorber 7 to absorb very strong shocks applied during travel. Additionally, the height from the ground to the lower end of the rear shock absorber 7 can be further increased. As such, the rear shock absorber 7 can reliably avoid contacting obstacles on the ground during travel.

In the present embodiment, the drive motor M is located above the rear of the engine E and secured to the engine E. Thus, the engine E and drive motor M secured to each other can be collectively secured to the vehicle body frame 4, and the construction where the engine E and drive motor M are supported by the vehicle body frame 4 can easily be produced.

In the present embodiment, the upper mounting portion 26 of the rear shock absorber 7 is connected via the bridge structure 24 to the drive motor M located above the rear of the engine E. Thus, the upper mounting portion 26 of the rear shock absorber 7 is mounted on the drive motor M having higher rigidity in the up-down direction than in the vehicle width direction. Since the upper mounting portion 26 of the rear shock absorber 7 is mounted on a component having high rigidity in the up-down direction, the upper mounting portion 26 itself need not have high rigidity. This allows for a weight reduction of the upper mounting portion 26 of the rear shock absorber 7 mounted on the drive motor M. The weight reduction of the upper mounting portion 26 of the rear shock absorber 7 leads to a weight reduction of the motorcycle 1, resulting in improved fuel efficiency of the motorcycle 1. This allows for a reduction in the operating cost of the motorcycle 1. Additionally, the motorcycle 1 having a reduced weight is steerable effortlessly, maneuverable easily, and permits the brakes to work well, thus exhibiting improved travel performance.

In the present embodiment, the drive motor M is located in a space lying behind the engine E and above the crankcase 15. Thus, the drive motor M is located in a space bounded on the front by the engine E extending longitudinally in the up-down direction and bounded below by the crankcase 15 extending longitudinally in the front-rear direction. This arrangement is space-efficient. As such, the engine E and drive motor M can be arranged within a small space, and the size of the motorcycle 1 can be reduced.

In the present embodiment, the bridge structure 24 is located behind the engine E and drive motor M and mounted on both the engine E and drive motor M to bridge the engine E and drive motor M. Further, the upper mounting portion 26 of the rear shock absorber 7 is connected to the drive motor M via the bridge structure 24. Thus, the upper mounting portion 26 of the rear shock absorber 7 is indirectly mounted on the drive motor M with the bridge structure 24 interposed between the upper mounting portion 26 and the drive motor M. Since the upper mounting portion 26 of the rear shock absorber 7 is connected to the drive motor M via the bridge structure 24, shocks directly applied to the drive motor M through the rear shock absorber 7 can be reduced, and the durability of the drive motor M can be increased.

In the present embodiment, the bridge structure 24 is plate-shaped. Thus, in the event that a force applied in such a direction as to extend or contract the rear shock absorber 7 is transmitted to the bridge structure 24, the force acts on the bridge structure 24 as a tensile or compressive force along the plane in which the bridge structure 24 extends. Thus, the bridge structure 24 can exhibit its strength against tensile and compressive loads in the in-plane direction and receive strong forces.

In the present embodiment, the bridge structure 24 pivotally supports the swing arm 22. Thus, loads acting on the swing arm 22 can be received by the bridge structure 24. As such, loads acting on the engine E and drive motor M can be reduced, and the durability of the engine E and drive motor M can be increased.

In the present embodiment, the lower mounting portion 27 of the rear shock absorber 7 is connected to the swing arm 22 via the link 28. Thus, the nodes 31d and 31b are the points of effort, the node 31a is the point of support, and the node 31c is the point of load. Since the points of support, effort, and load are located between the rear shock absorber 7 and the swing arm 22, the flexibility in designing the lower mounting portion 27 of the rear shock absorber 7 can be increased.

In the present embodiment, the link 28 supports the rear shock absorber 7 at a location below the engine E. Thus, the rear shock absorber 7 can be sufficiently long in the up-down direction. As such, the rear shock absorber 7 can absorb strong shocks.

Figure 7A:
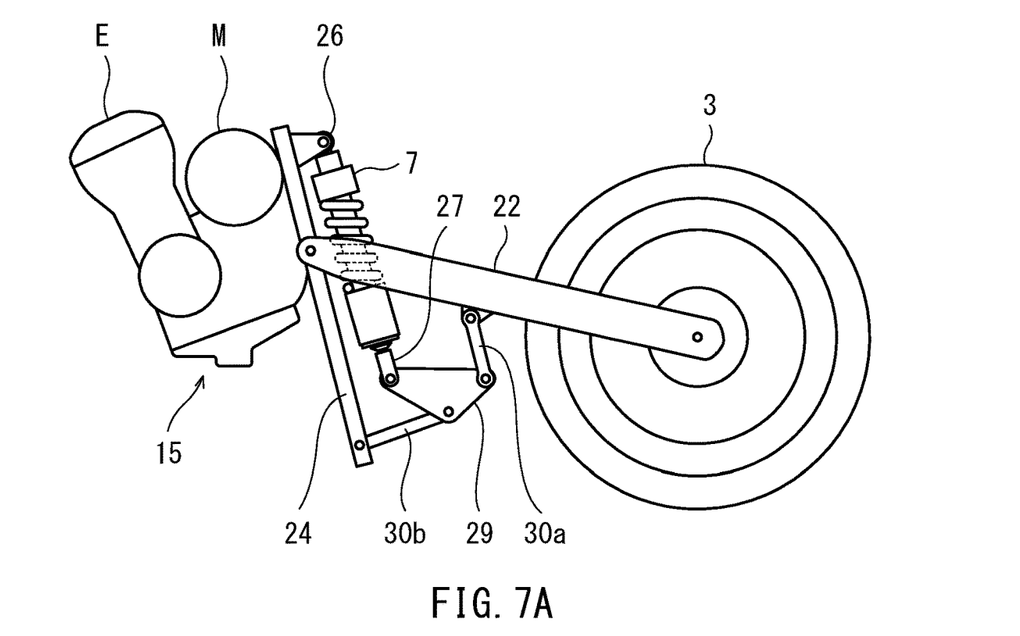
FIG. 7A illustrates a variant in which a triangular link plate is connected to a swing arm and a bridge structure via a rectangular link plate.

The relationship among the locations of the rear shock absorber 7, swing arm 22, and link 28 is not limited to that in the above embodiment. The rear shock absorber 7, swing arm 22, and link 28 may be located in another relationship. For example, as shown in FIG. 7A, the lower mounting portion 27 of the rear shock absorber 7 may be pivotally connected to the triangular link plate 29, the triangular link plate 29 may be pivotally connected to the bridge structure 24 via a rectangular link plate 30b, and the triangular link plate 29 may be pivotally connected to the swing arm 22 via another rectangular link plate 30a.

Figure 7B:
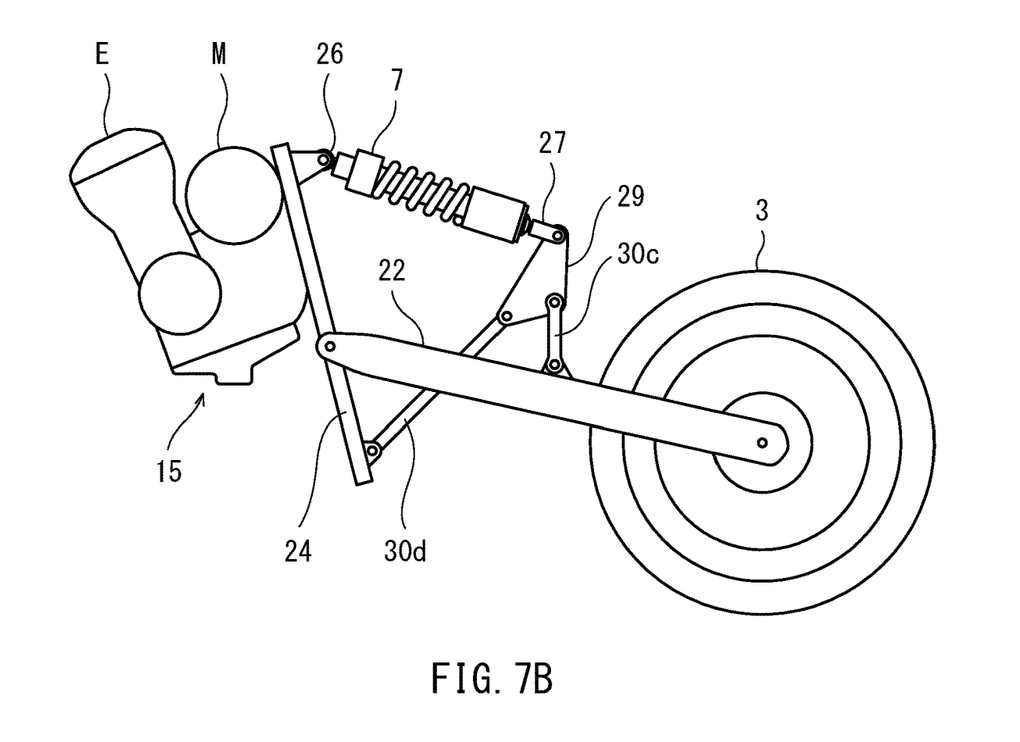
FIG. 7B illustrates a variant in which the triangular link plate is located above the swing arm.

Alternatively, for example, the triangular link plate 29 may be located above the swing arm 22 as shown in FIG. 7B. In this case, as shown in FIG. 7B, the lower mounting portion 27 of the rear shock absorber 7 may be pivotally connected to the triangular link plate 29 located above the swing arm 22, the triangular link plate 29 may be pivotally connected to the swing arm 22 via a rectangular link plate 30c, and the triangular link plate 29 may be pivotally connected to the bridge structure 24 via a rectangular link plate 30d. The rear shock absorber 7, swing arm 22, and link 28 may be located in any other relationship insofar as the lower mounting portion 27 of the rear shock absorber 7 is connected to the swing arm 22 via the link 28 and the upper mounting portion 26 of the rear shock absorber 7 is connected via the bridge structure 24 to the drive motor M located above the rear of the engine E.

Second Embodiment

Hereinafter, a motorcycle according to a second embodiment will be described. The features identical to those of the first embodiment will not be described again, and only the features distinguishing the second embodiment from the first embodiment will be described. In the motorcycle of the first embodiment described above, the power unit 12 including the engine E and the drive motor M located in a space lying behind the engine E and above the crankcase 15 is the supported structure supported by the vehicle body frame 4, and the upper mounting portion 26 of the rear shock absorber 7 is indirectly connected to the drive motor M. The motorcycle of the second embodiment differs from that of the first embodiment in that a battery case enclosing a battery and the drive motor M located above the battery case serve as the supported structure supported by the vehicle body frame 4 and that the upper mounting portion 26 of the rear shock absorber 7 is indirectly connected to the drive motor M located above the battery case.

Figure 8:
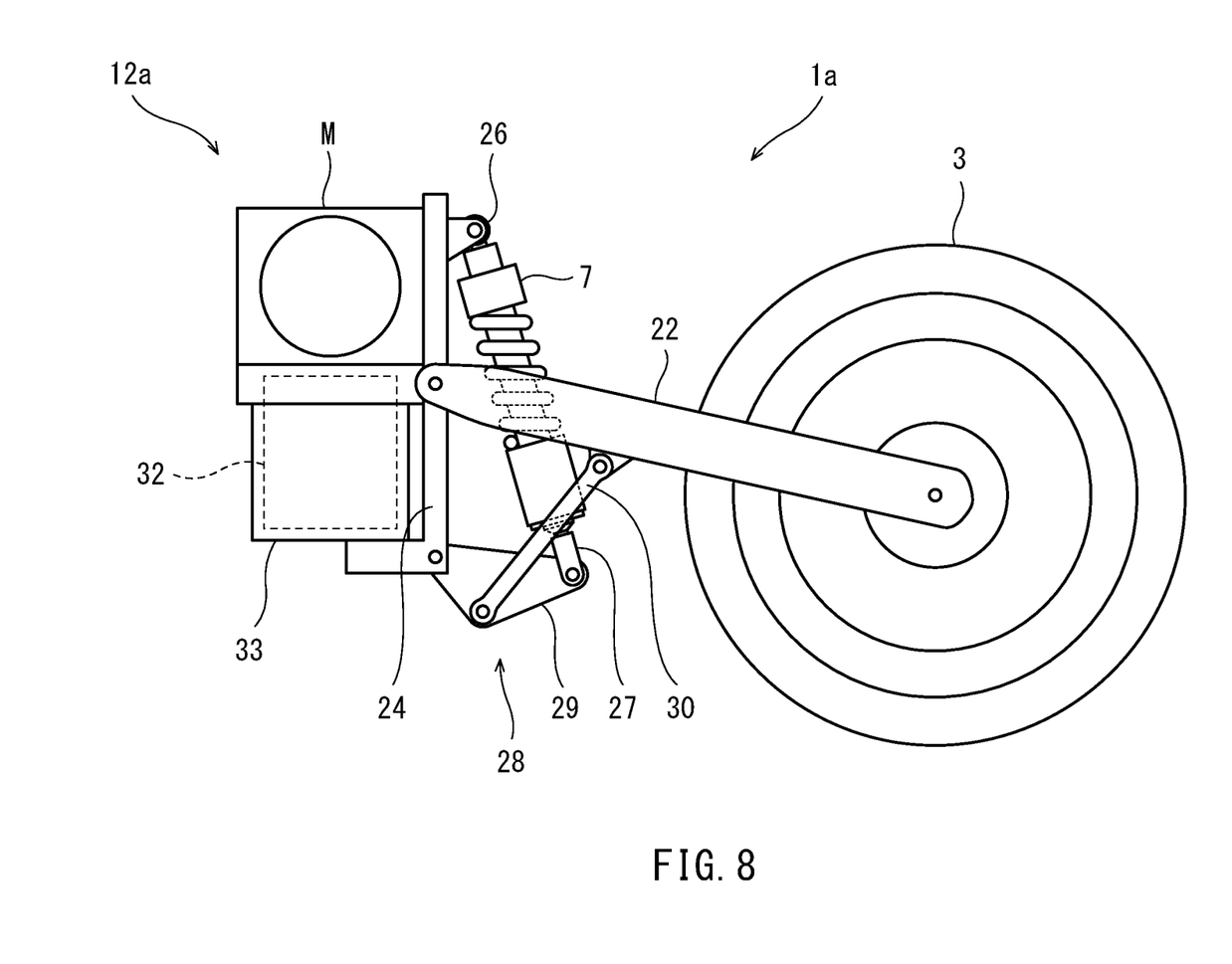
FIG. 8 is a left side view of a power unit, a rear shock absorber, a rear suspension, and their vicinity in a motorcycle according to a second embodiment.

FIG. 8 is a side view of a power unit 12a, the rear shock absorber 7, and their vicinity in a motorcycle 1a according to the second embodiment. In the second embodiment, as shown in FIG. 8, the power unit 12a does not include the engine E but consists of the drive motor M. That is, the motorcycle 1a of the second embodiment is an electric motorcycle in which rotational drive power to be transmitted to the rear wheel 3 is produced only by the operation of the drive motor M. Thus, in the second embodiment, the drive motor M functions as the drive source that produces rotational drive power to be transmitted to the rear wheel 3.

Below the drive motor M there are: a battery 32 that stores electric power for operating the drive motor M and that supplies an electric current to the drive motor M; and a battery case 33 enclosing the battery 32. The drive motor M and battery case 33 are aligned in the up-down direction. In the second embodiment, as in the first embodiment, the drive motor M exhibits relatively high rigidity. In the motorcycle 1a of the second embodiment, the battery case 33 and the drive motor M serve as the supported structure supported by the vehicle body frame 4.

In the motorcycle 1a configured as described above, the first element includes the battery 32 and the battery case 33 enclosing the battery 32. The second element includes the drive motor M having the drive shaft. The battery 32 and battery case 33 serving as the first element have the function of supplying an electric current to the drive motor M (first function). The drive motor M serving as the second element has the function of producing rotational drive power to be transmitted to the rear wheel 3 when in operation (second function).

In the second embodiment, the upper mounting portion 26 of the rear shock absorber 7 is connected via the bridge structure 24 to the drive motor M located above the battery case 33. Thus, the upper mounting portion 26 of the rear shock absorber 7 is mounted on the drive motor M having high rigidity in the up-down direction. Since the upper mounting portion 26 of the rear shock absorber 7 is mounted on a component having high rigidity in the up-down direction, the upper mounting portion 26 itself need not have high rigidity. This allows for a weight reduction of the upper mounting portion 26 of the rear shock absorber 7 mounted on the drive motor M. The weight reduction of the upper mounting portion 26 of the rear shock absorber 7 leads to a weight reduction of the motorcycle 1a, resulting in improved fuel efficiency of the motorcycle 1a. Additionally, the weight reduction of the motorcycle 1a improves the travel performance of the motorcycle 1a.

Third Embodiment

Hereinafter, a motorcycle according to a third embodiment will be described. The features identical to those of the first and second embodiments will not be described again, and only the features distinguishing the third embodiment from the other embodiments will be described. In the configuration of the first embodiment described above, the power unit 12 including the engine E and the drive motor M located in a space lying behind the engine E and above the crankcase 15 is the supported structure supported by the vehicle body frame 4, and the upper mounting portion 26 of the rear shock absorber 7 is indirectly connected to the drive motor M. In the configuration of the second embodiment described above, a battery case enclosing a battery and the drive motor M located above the battery case serve as the supported structure supported by the vehicle body frame 4, and the upper mounting portion 26 of the rear shock absorber 7 is indirectly connected to the drive motor M. The third embodiment differs from the first and second embodiments in that the drive motor M and a battery case enclosing a battery and located above the drive motor M serve as the supported structure supported by the vehicle body frame 4 and that the upper mounting portion 26 of the rear shock absorber 7 is indirectly connected to the battery case.

Figure 9:
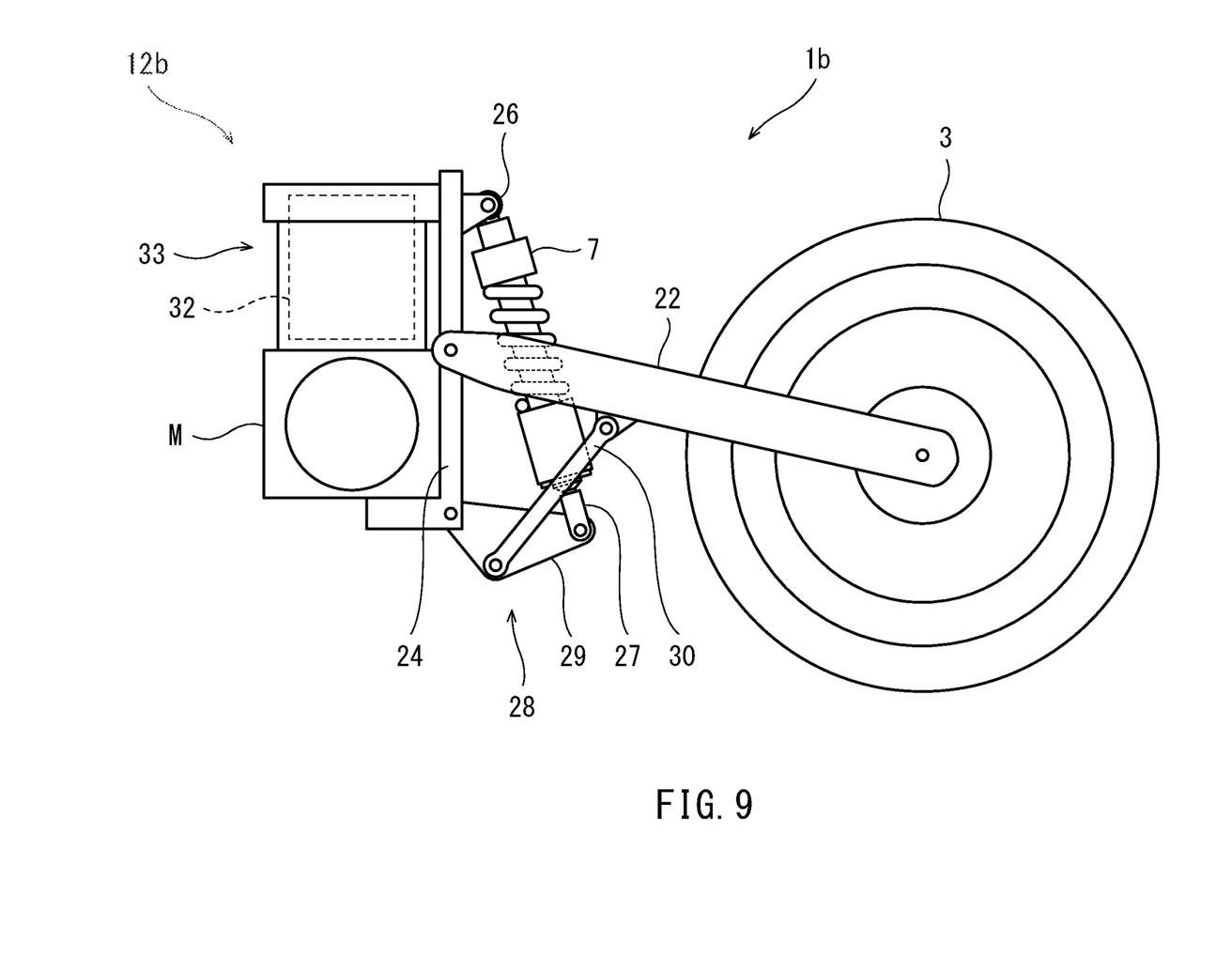
FIG. 9 is a left side view of a power unit, a rear shock absorber, a rear suspension, and their vicinity in a motorcycle according to a third embodiment.

FIG. 9 is a side view of a power unit 12b, the rear shock absorber 7, and their vicinity in a motorcycle 1b according to the third embodiment. In the third embodiment, as shown in FIG. 9, the power unit 12b does not include the engine E but consists of the drive motor M, like the power unit 12a of the second embodiment. That is, the motorcycle 1b of the third embodiment is an electric motorcycle in which rotational drive power to be transmitted to the rear wheel 3 is produced only by the operation of the drive motor M. Thus, in the third embodiment, the drive motor M functions as the drive source that produces rotational drive power to be transmitted to the rear wheel 3.

Above the drive motor M there are: a battery 32 that stores electric power for operating the drive motor M and that supplies an electric current to the drive motor M; and a battery case 33 enclosing the battery 32. The drive motor M and battery case 32 are aligned in the up-down direction. In the third embodiment, the relationship between the locations of the drive motor M and battery case 33 is reverse to that in the second embodiment; namely, the battery case 33 is at an upper location, and the drive motor M is at a lower location. In the third embodiment, the battery case 33 includes an internal framework, and this framework is made of metal and has higher strength in the up-down direction than in the vehicle width direction. Thus, the battery case 33 has high rigidity in the up-down direction.

In the motorcycle 1*b* configured as described above, the first element includes the drive motor M having the drive shaft. The second element includes the battery 32 and the battery case 33 enclosing the battery. The drive motor M serving as the first element has the function of producing rotational drive power to be transmitted to the rear wheel 3 when in operation (first function). The battery 32 and battery case 33 serving as the second element have the function of supplying an electric current to the drive motor M (second function).

In the third embodiment, the upper mounting portion 26 of the rear shock absorber 7 is connected via the bridge structure 24 to the battery case 33 located above the drive motor M. Thus, the upper mounting portion 26 of the rear shock absorber 7 is mounted on the battery case 33 having high rigidity in the up-down direction. Since the upper mounting portion 26 of the rear shock absorber 7 is mounted on a component having high rigidity in the up-down direction, the upper mounting portion 26 itself need not have high rigidity. This allows for a weight reduction of the upper mounting portion 26 of the rear shock absorber 7 mounted on the drive motor M. The weight reduction of the upper mounting portion 26 of the rear shock absorber 7 leads to a weight reduction of the motorcycle 1*b*, resulting in improved fuel efficiency of the motorcycle 1*b*. Additionally, the weight reduction of the motorcycle 1*b* improves the travel performance of the motorcycle 1*b*.

In the configuration of the first embodiment described above, the first element is the engine E, and the second element is the drive motor M. In the configuration of the second embodiment described above, the first element is the battery case, and the second element is the drive motor M. In the configuration of the third embodiment described above, the first element is the drive motor M, and the second element is the battery case. However, the present disclosure is not limited to the configurations of the above embodiments. The first and second elements of the supported structure supported by the vehicle body frame 4 may be different from those in the above embodiments. The combination of the first and second elements may be different from those in the above embodiments insofar as at least one of the first element or the second element functions as a drive source that produces rotational drive power to be transmitted to the rear wheel 3. For example, an oil tank storing a lubricant oil may be the first element, and the drive motor M may be the second element. The number of the elements of the supported structure supported by the vehicle body frame 4 need not be two, and the supported structure may include one or more elements other than the first and second elements. Three or more elements may be supported by the vehicle body frame 4 and constitute the supported structure. In this case, it is sufficient that two of the three or more elements be the first and second elements aligned in the up-down direction.

In the configurations of the embodiments described above, the motorcycles include two shock absorbers, i.e., the front and rear shock absorbers. However, the motorcycle according to the present disclosure is not limited to the configurations of the above embodiments. The motorcycle need not include the front shock absorber and may include only one shock absorber. In this case, it is sufficient that the upper mounting portion of the shock absorber be connected to the upper one of the first and second elements aligned in the up-down direction, in particular to the second element located above the first element. The motorcycle may include three or more shock absorbers. It is sufficient that the upper mounting portion of any one of the shock absorbers be connected to the upper one of the first and second elements aligned in the up-down direction, in particular to the second element located above the first element.

In the embodiments described above, the straddle vehicle is embodied as a motorcycle. However, the straddle vehicle of the present disclosure is not limited to motorcycles as described in the above embodiments. The straddle vehicle may be a motor tricycle or any other type of straddle vehicle.

What is claimed is:

1. A straddle vehicle comprising:
   a front wheel;
   a rear wheel;
   a vehicle body frame;
   a suspension structure including a swing arm rotatably supporting the rear wheel and a shock absorber to absorb shocks applied to the swing arm through the rear wheel, the swing arm being elastically suspended on the vehicle body frame via the shock absorber;
   a supported structure supported by the vehicle body frame; and
   a plate-shaped bridge structure extending in an up-down direction,
   wherein the supported structure includes a first element and a second element located above the first element,
   wherein at least one of the first element or the second element is a motor that produces rotational drive power to be transmitted to the rear wheel,
   wherein the bridge structure is located behind the first and second elements and mounted on both the first and second elements to bridge the first and second elements in the up-down direction,
   wherein the shock absorber includes an upper mounting portion and a lower mounting portion,
   wherein the upper mounting portion of the shock absorber is connected to an upper end of the bridge structure, and
   wherein the lower mounting portion of the shock absorber is connected to a lower end of the bridge structure via a link.

2. The straddle vehicle according to claim 1,
   wherein the first element includes a crankcase enclosing a crankshaft that produces rotational driver power to be transmitted to the rear wheel,
   wherein the second element includes the motor including a drive shaft,
   wherein the crankcase includes a support that supports the motor, and
   wherein the upper mounting portion is located at a height above the support in the up-down direction.

3. The straddle vehicle according to claim 1,
   wherein the first element includes the motor including a drive shaft, and
   wherein the second element includes a battery and a battery case enclosing the battery.

4. The straddle vehicle according to claim 1,
   wherein the second element includes the motor including a drive shaft, and
   wherein the first element includes a battery and a battery case enclosing the battery.

5. The straddle vehicle according to claim 1, wherein the upper mounting portion is located at a height above a connection portion at which the bridge structure is connected to the vehicle body frame.

6. The straddle vehicle according to claim 1, wherein the lower mounting portion connected to the bridge structure via the link is further connected to the swing arm via the link.

7. The straddle vehicle according to claim 2, further comprising a cylinder located above a front portion of the crankcase,
wherein the upper mounting portion is located at a height such that the upper mounting portion as viewed in a front-rear direction of the vehicle overlaps the cylinder.

8. The straddle vehicle according to claim 1, wherein the first and second elements are connected to each other at a point other than points where the bridge structure is connected to the first and second elements.

9. The straddle vehicle according to claim 1, wherein the upper mounting portion is mounted to the bridge structure in a vicinity of the upper end of the bridge structure.

10. The straddle vehicle according to claim 1, wherein the bridge structure is located ahead of the shock absorber and extends in the up-down direction.

11. The straddle vehicle according to claim 1, wherein a thickness of the bridge structure extends along a front-rear direction of the vehicle.

12. The straddle vehicle according to claim 1, wherein the bridge structure is connected to the second element.

13. The straddle vehicle according to claim 1, wherein the upper mounting portion of the shock absorber is mounted to the bridge structure at a height above a portion of the first element that faces the bridge structure.

14. The straddle vehicle according to claim 1, wherein the swing arm is pivotally connected to the bridge structure.

15. The straddle vehicle according to claim 1, wherein the bridge structure is made of a plastic.

16. A straddle vehicle comprising:
a front wheel;
a rear wheel;
a vehicle body frame;
a suspension structure including a swing arm rotatably supporting the rear wheel and a shock absorber to absorb shocks applied to the swing arm through the rear wheel, the swing arm being elastically suspended on the vehicle body frame via the shock absorber;
a supported structure supported by the vehicle body frame; and
a bridge structure,
wherein the supported structure includes a first element and a second element located above the first element,
wherein the bridge structure is located behind the first and second elements and mounted on both the first and second elements to bridge the first and second elements,
wherein the first element includes a crankcase enclosing a crankshaft that produces rotational driver power to be transmitted to the rear wheel,
wherein the second element includes a motor that produces rotational drive power to be transmitted to the rear wheel,
wherein the motor is located above the crankcase and supported by the crankcase, and
wherein the shock absorber includes an upper mounting portion connected to the motor via the bridge structure, the upper mounting portion being connected to the bridge structure at a height such that the upper mounting portion as viewed in a front-rear direction of the vehicle overlaps a cylinder located above a front portion of the crankcase.

* * * * *